(12) United States Patent
Matsui et al.

(10) Patent No.: US 6,438,298 B1
(45) Date of Patent: Aug. 20, 2002

(54) OPTICAL DEVICE USING PHOTONICS

(75) Inventors: Eriko Matsui, Kanagawa; Akira Ishibashi, Tokyo; Yoshifumi Mori, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/616,687

(22) Filed: Jul. 14, 2000

(30) Foreign Application Priority Data

Jul. 19, 1999 (JP) .......................................... P11-204037

(51) Int. Cl.$^7$ .............................. G02B 6/26; G09G 3/20; G09G 3/34
(52) U.S. Cl. ................................ 385/50; 385/4; 385/5; 385/141; 345/55; 345/84; 348/804
(58) Field of Search .............................. 385/4, 50, 141, 385/5, 16; 345/55, 84; 348/804

(56) References Cited

U.S. PATENT DOCUMENTS

| | | | |
|---|---|---|---|
| 4,578,709 A | * | 3/1986 | Lang et al. .................. 358/230 |
| 4,737,003 A | * | 4/1988 | Matsumura et al. ..... 350/96.14 |
| 5,796,884 A | * | 8/1998 | Wingo .......................... 385/16 |
| 5,962,967 A | * | 10/1999 | Kiruschev et al. .......... 313/491 |
| 6,229,509 B1 | * | 5/2001 | DeLuca et al. ............... 345/84 |

* cited by examiner

Primary Examiner—Hemang Sanghavi
Assistant Examiner—Omar Rojas, Jr.
(74) Attorney, Agent, or Firm—Sonnenschein, Nath & Rosenthal

(57) ABSTRACT

An optical device includes a plurality of first optical waveguides (or optical fibers) arranged in the horizontal direction; a plurality of second optical waveguides (or optical fibers) arranged on the same plane as the plane on which the first optical waveguides (or optical fibers) are arranged, the second optical waveguides (or optical fibers) being perpendicular or nearly perpendicular to the first optical waveguides (or optical fibers); and elements to be excited by light rays waveguided in the first and second optical waveguides(or optical fibers), the elements being arranged at crossing portions at which the first and second optical waveguides (or optical fibers) cross each other. In this display, the elements to be excited are selected for each line by intensities of light rays in the first optical waveguides (or optical fibers) functioning as horizontal waveguides (or optical fibers), and light rays in the second waveguides (or optical fibers) functioning as vertical waveguides (or optical fibers) are modulated in intensity on the basis of data signals, and the data signal light rays whose intensities have been modulated are extracted to the outside via the selected elements to be excited.

2 Claims, 12 Drawing Sheets

F I G. 6A
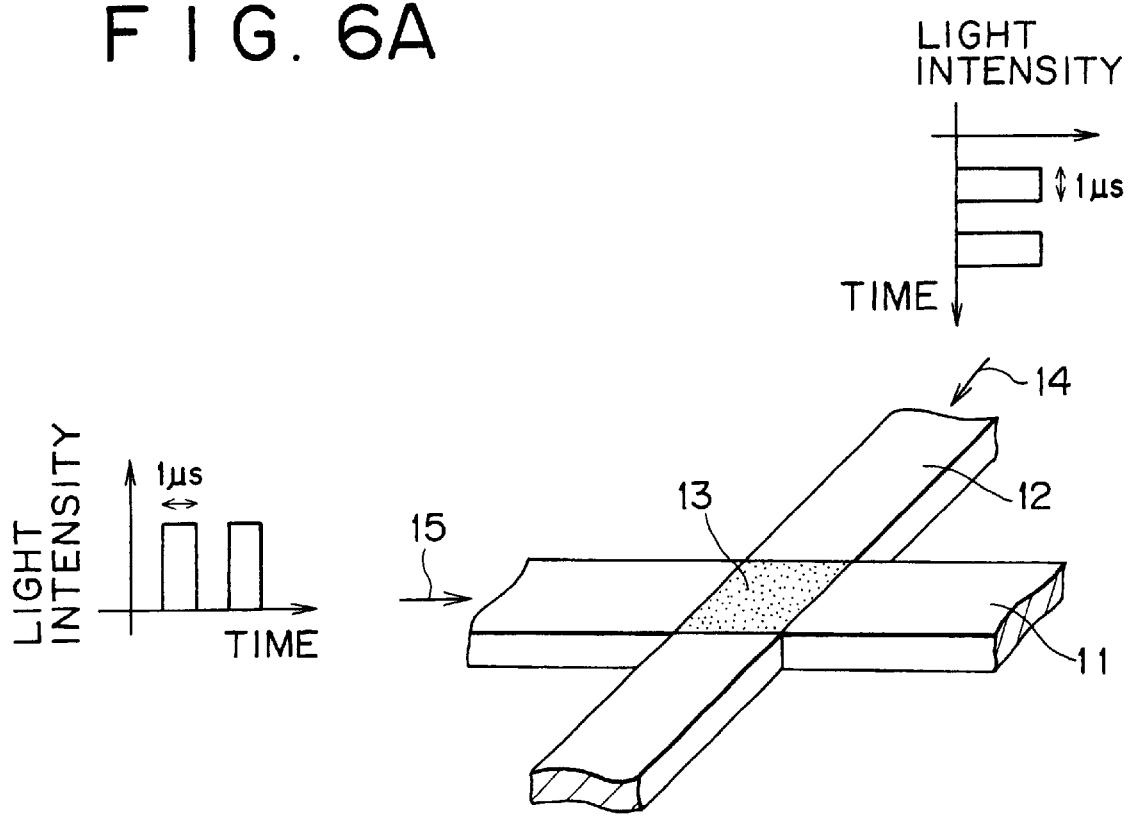
F I G. 6B
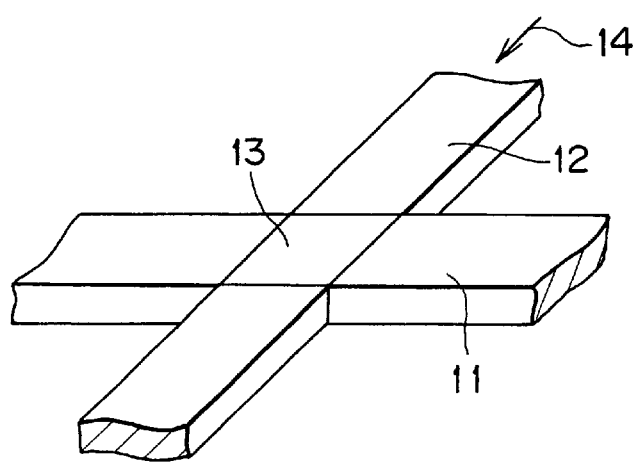

FIG. 12
NAPHTHOPYRAN DERIVATIVE 
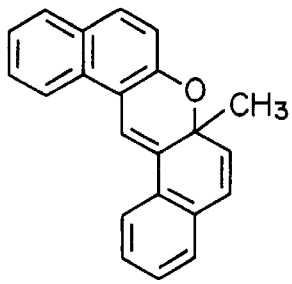
POLYDIACETYLENE 
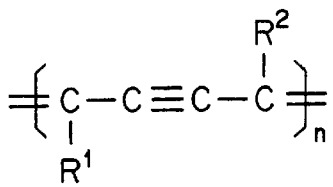
($R^1$, $R^2$: ALKYL GROUP)
SPIROBENZOPYRAN 
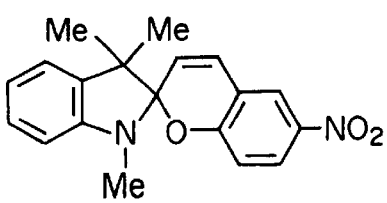
AZOBENZENE 
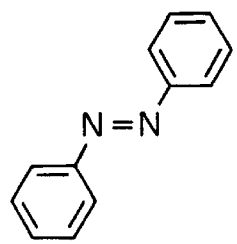
FULGIDE 
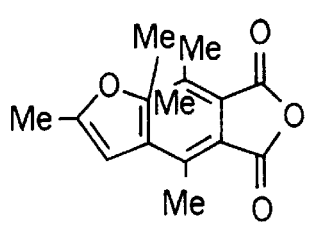
DIARYLETHENE 
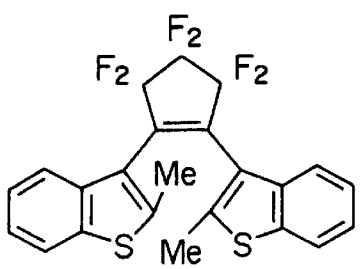
BENZOPHENONE BASED POLYIMIDE 
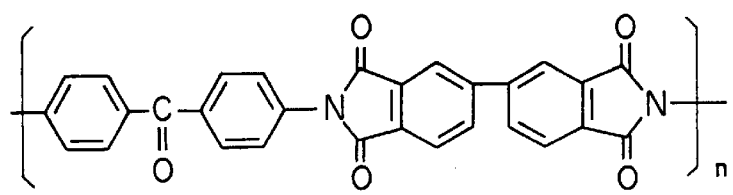

POLYSILOXANE

OPTICAL DEVICE USING PHOTONICS

RELATED APPLICATION DATA

The present application claims priority to Japanese Application No. P11-204037 filed Jul. 19, 1999; which application is incorporated herein by reference to the extent permitted by law.

BACKGROUND OF THE INVENTION

The present invention relates to an optical device, and particularly to an optical device such as a display device having at least an image optical display function or a two-dimensional optical operating device.

Recently, the demand for display devices has become stronger as man-machine interfaces. In general, the display device is classified into a spontaneous light emission type and a light receiving type. Examples of the spontaneous light type may include a CRT (Cathode Ray Tube), a PDP (Plasma Display Panel), an ELD (Electroluminescence Display), a VFD (Vacuum Fluorescent Display), and an LED (Light Emitting Diode). Examples of the light receiving type may include an LCD (Liquid Crystal Display), and an ECD (Electrochromic Display). The performances of these displays have been improved by development of electronics, and the quality and cost thereof have already reached the period of maturity or they are anticipated to reach the period of maturity sooner or later.

The conventional display using electronics requires electrodes for applying an electric field and a current on a display screen, and accordingly, if it is intended to enlarge the display panel, an increase in electric resistance due to the electrodes and wiring thereof inevitably occurs. In other words, the display panel, that is, the screen size of the display is limited for suppressing the increase in electric resistance due to the electrodes and wiring thereof. In addition, since the display is generally made from a hard material, the degree of freedom in shape of the display is small, and consequently, it is difficult to variously change the shape of the display and make compact the size of the display.

SUMMARY OF THE INVENTION

An object of the present invention is to provide an optical device capable of ensuring a display function of forming an image having a high quality, typically, a high contrast, enlarging the size of the screen, and performing collective light emission operation, by controlling light not with the aid of an electric field and current but with the aid of excitation of light intensity.

The present inventor believes that a technology called "photonics" will surpass the above-described conventional electronics in the 21th century. While electronics control electrons via an electric field, photonics controls light without the use of any electric field.

The vibrational field of light functioning as electromagnetic radiation has a strong interaction with charged particles in a molecule, that is, electrons and protons in a molecule. With respect to protons, a nucleus packed with protons and neutrons is regarded as stationary even if it interacts with light because the nucleus has a large mass. In other words, the interaction between light and a nucleus is negligible from the interaction between light and a substance. Meanwhile, an electron having a mass being as small as about $1/2000$ that of a proton can sufficiently follow the vibrational field of light vibrating at a high frequency. Accordingly, the interaction between light and a substance may be regarded as the interaction between light and electrons in a molecule. A large number of electrons are present in a molecule. Of these electrons, those located on the outer orbit constrained weakly by a nucleus are easy to interact with light.

The absorption of light is a transition from a state $S_0$ to $S_n$ in the interaction between light and electrons in a molecule, which terminates in the order of femtosecond. Such an instable state (Frank-Condon state) does not continue so long, and a nucleus having a large mass and positively charged is shifted in its coordinate to cause the relaxation. The time scale of occurrence of this relaxation is in the order of picosecond. A state $S_1$, which is a relatively stable excitation state, is generated along with relaxation of the nucleus. The life of the $S_1$ state is in the order of nanosecond, which time substantially governs the steps associated with the excitation state caused by absorption of light.

The present invention, particularly, provides a new, useful display using the photonics which will get ahead of the electronics in the 21th century. Concretely, according to a first aspect of the present invention, there is provided an optical device including: a first optical waveguide (or optical fiber); a second optical waveguide (or optical fiber) crossing to the first optical waveguide; and an element to be excited by light rays waveguided in the first and second optical waveguides, the element being disposed at a crossing portion at which the first and second optical waveguides cross each other; wherein the optical device has at least an optical display function.

According to the optical device of the present invention, since the elements to be excited are excited not with the aid of the conventional electronics but with the aid of the photonics, more concretely, the elements disposed at the crossing portions of the first and second optical waveguides are excited by light rays waveguided in the first and second optical waveguides, to selectively extract and cutoff the light rays from the elements. As a result, since an image can be displayed on a display screen only by optical excitation, without use of an electric field and a current on the display screen (except for a semiconductor laser and the like), it is possible to realize an optical display function having a high quality, for example, a high contract, and also realize an optical operation function. Further, since electrodes which have obstructed the enlargement of a panel are not provided, there is no limitation to a screen size of an optical waveguide (or optical fiber) display, so that the display screen can be formed into an arbitrary size, for example, into a large size. In addition, since the display can be made from a soft material, it can be formed into an arbitrary shape.

In the above optical device, preferably, the element to be excited is one kind or a combination of two kinds or more selected from a group consisting of an element capable of modulating its refractive index by optical excitation, an element capable of modulating its distribution of refractive index by optical excitation, an element capable of modulating its light emission intensity by optical excitation, an element capable of modulating its coloring density by optical excitation, and element capable of modulating its dielectric constant by optical excitation, an element capable of modulating its magnetic permeability by optical excitation, a liquid crystal element capable of changing its orientation state of liquid crystal by optical excitation, and an element allowing light scattering by optical excitation, and a light ray is selectively extracted or cutoff from the crossing portion by the optical excitation, to perform optical display and/or optical operation.

In the above optical device, preferably, the first optical waveguide is configured as a plurality of first optical waveguides (or optical fibers) and the second optical waveguide is configured as a plurality of second optical waveguides (or optical fibers); and light sources are directly or indirectly optically coupled to the pluralities of optical waveguides in such a manner that when the light sources are directly optically coupled to the optical waveguides, the optical waveguides and the light sources are provided on one-to-one correspondence; and when the light sources are indirectly optically coupled to the optical waveguides, the light sources are connected to at least one of the optical waveguides via optical waveguide members.

According to a second aspect of the present invention, there is provided an optical device including: a plurality of first optical waveguides (or optical fibers) arranged in the horizontal direction; a plurality of second optical waveguides (or optical fibers) arranged in the direction perpendicular or nearly perpendicular to the first optical waveguides, the second optical waveguides being not optically coupled to the first optical waveguides at crossing portions at which the first and second optical waveguides (or optical fibers) cross each other; and elements to be excited by light rays waveguided in the first and second optical waveguides, the elements being arranged at the crossing portions; wherein the elements to be excited are selected for each line by intensities of light rays in the first optical waveguides (or optical fibers) functioning as horizontal waveguides (or optical fibers); and light rays in the second optical waveguides (or optical fibers) functioning as vertical waveguides (or optical fibers) are modulated in intensity on the basis of data signals, and the data signal light rays whose intensities have been modulated are extracted to the outside via the selected elements to be excited.

According to a third aspect of the present invention, there is provided an optical device including: a plurality of first optical waveguides (or optical fibers) arranged in the horizontal direction; a plurality of second optical waveguides (or optical fibers) arranged on the same plane as that on which the first optical waveguides (or optical fibers) are arranged, the second optical waveguides (or optical fibers) being perpendicular or nearly perpendicular to the first optical waveguides (or optical fibers); and elements to be excited by light rays waveguided (or optical fibers) in the first and second optical waveguides (or optical fibers), the elements being arranged at crossing portions at which the first and second optical waveguides (or optical fibers) cross each other; wherein the elements to be excited are selected for each line by intensities of light rays in the first optical waveguides (or optical fibers) functioning as horizontal waveguides (or optical fibers); and light rays in the second waveguides functioning as vertical waveguides (or optical fibers) are modulated in intensity on the basis of data signals, and the data signal light rays whose intensities have been modulated are extracted to the outside via the selected elements to be excited.

In the above optical device, preferably, the element to be excited is provided with means capable of controlling the temperature of the element to be excited or means capable of applying a high frequency electric field to the element to be excited. With this configuration, in particular, when the element is configured as a liquid crystal device, the reversal of polarization of light crystal can be uniformly generated by increasing the temperature of the liquid crystal or applying a high frequency magnetic field to the liquid crystal.

BRIEF DESCRIPTION OF THE DRAWINGS

FIGS. 6A and 6B are enlarged perspective views of a display pixel portion according to a second embodiment of the present invention, in combination with a drive example of the display pixel portion;

FIG. 12 is a diagram of structural formulas each showing an organic compound for a modulation element usable for the present invention;

DETAILED DESCRIPTION OF THE PREFERRED EMBODIMENTS

Hereinafter, embodiments of the present invention will be described in detail with reference to the drawings.

Figure 10A:
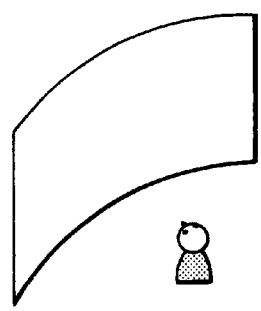
FIGS. 10A to 10D are schematic views showing the displays of the present invention.
Figure 10B:
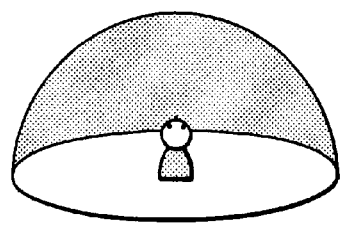
Figure 10C:
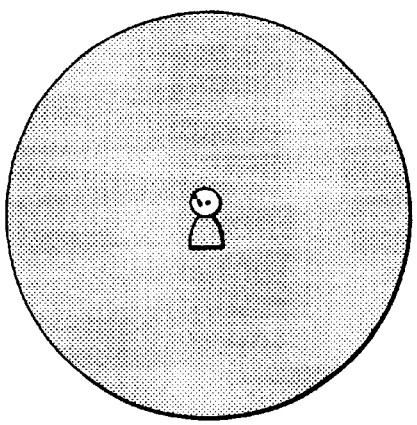
Figure 10D:
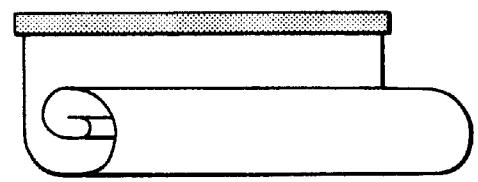

An optical waveguide (or optical fiber) display of the present invention, which uses a soft material such as a plastic material as a construction material, can be configured as a display whose shape can be variously changed as shown in FIGS. 10A to 10D. FIG. 10A shows a display having a screen curved at a center angle of 120 capable of giving an impressive image to a viewer; FIG. 10B shows a semi-spherical display; FIG. 10C shows a full-spherical display; and FIG. 10D shows a cocoon display which is hoisted into a compact size when not used.

Figure 1:
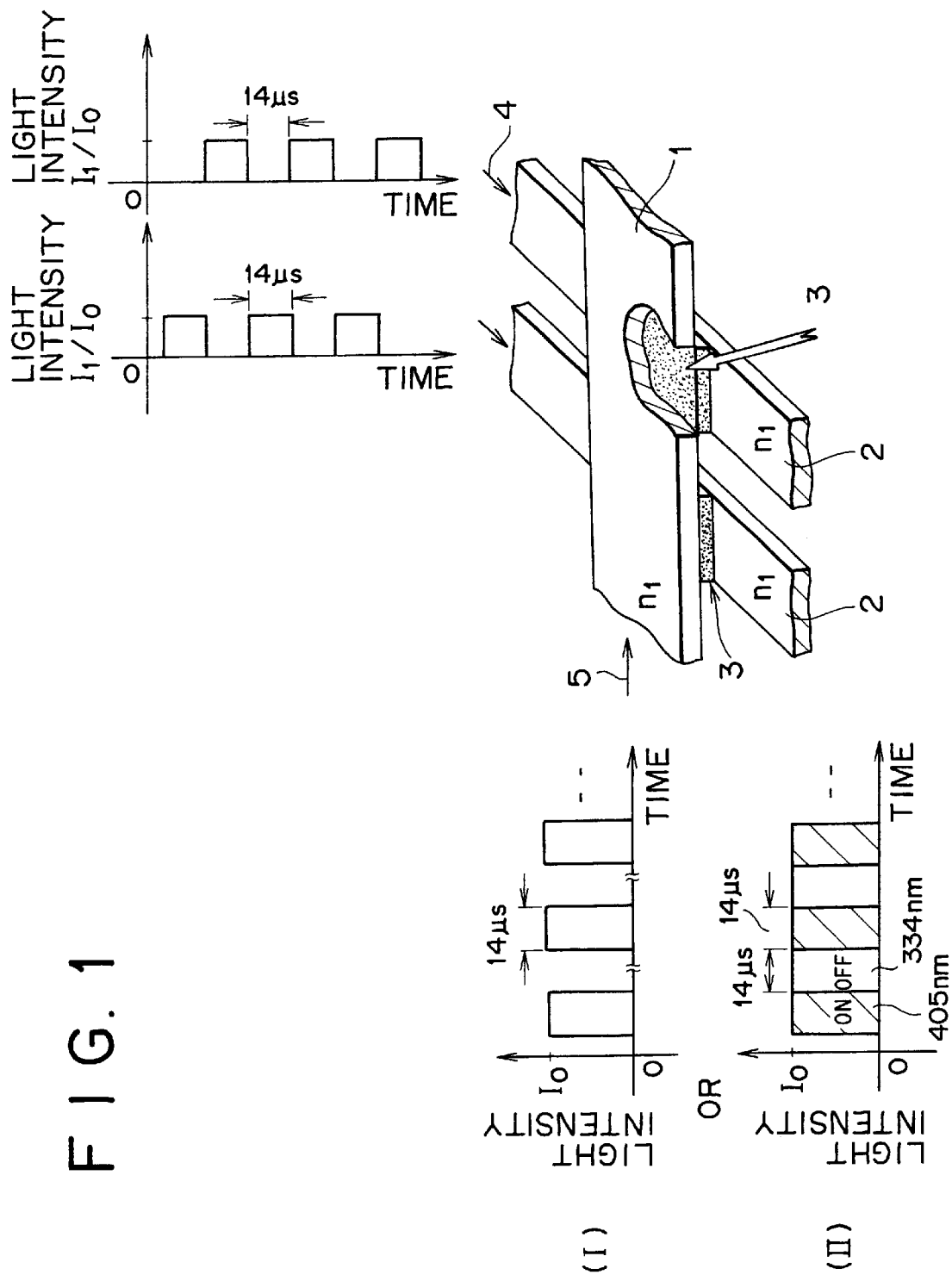
FIG. 1 is an enlarged perspective view, with an essential portion partially cutaway, of a display pixel portion according to a first embodiment of the present invention, in combination of a schematic view of a drive example of the display pixel portion.

FIG. 1 shows a pixel portion of an optical waveguide display according to a first embodiment of the present invention. At each pixel, two optical waveguides (or optical fibers) 1 and 2 cross at right angles or substantially at right angles. The optical waveguide (or optical fiber) may be configured as a quartz fiber or plastic fiber which has a good waveguide efficiency and is used for the communication purpose. Alternatively, three-dimensional high polymer waveguides (or optical fibers) may be formed into a cruciform pattern on a film board by a lithography process. While not shown, a semiconductor laser is typically used as a light source.

The optical waveguides (or optical fibers) are not optically coupled to each other at a crossing portion therebetween. At such a crossing portion, a modulation element 3 is disposed as an optical switch. The element 3 has a threshold value with respect to the intensity of an irradiation light ray and is excited when the light intensity exceeds the threshold value. Concretely, the element 3 made from an organic material, inorganic material, or a compound thereof is one kind or a combination of two kinds or more selected from a group consisting of an element capable of changing its refractive index, an element capable of changing its emission intensity, an element capable of changing its coloring density, an element capable of changing its dielectric constant, an element capable of changing its magnetic permeability, and an element capable of changing its distribution of refractive index. For example, the element 3 is made from a photochromic material which causes a modulation in refractive index as described below.

A photochromic molecule has a channel allowing recombination of its chemical bonding mode in an excited state, and therefore, when receiving light, such a molecule is converted into another isomer having a different electron state. The two isomers, which are identical in molecular weight but are different in chemical bonding mode, have different molecular properties, and are different not only in color but also in refractive index, dielectric constant, three dimensional structure, and the like. The optical properties and electric properties of a crystalline or amorphous film composed of these photochromic molecules, or a high polymer film containing these photochromic molecules are reversibly changed only when the film is irradiated with external light. As described above, the photoreaction generally terminates depending on the life (in the order of nano-seconds) of the excited state of electrons; however, since a usual photochromic material reacts with light in proportion to the number of the absorbed photons, the photoreaction of the photochromic material has no threshold value. Accordingly, it is required to use a special photochromic material for a display of the present invention.

Figure 4:
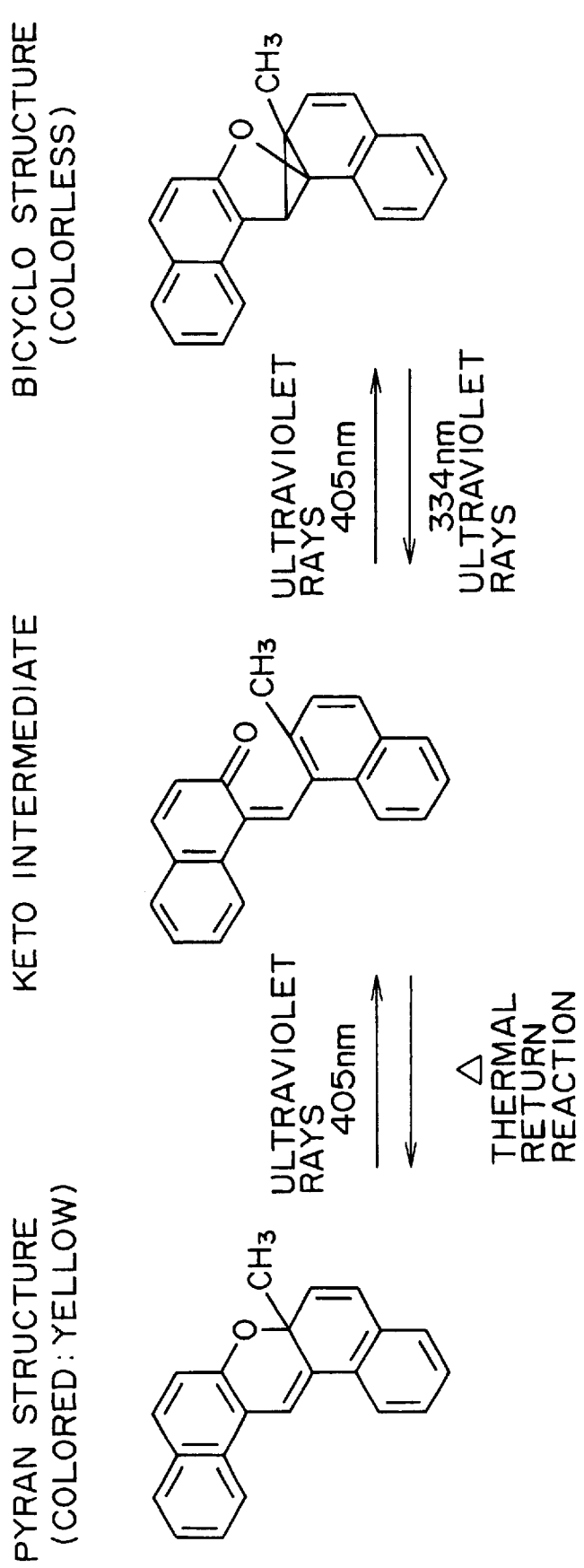
FIG. 4 is a diagram showing an example of a two-step/two-photon reaction of an organic compound usable for a modulation element of a display pixel portion.

The most preferable method is to use a photochromic material capable of causing a two-step/two-photon reaction. For example, as shown in FIG. 4, a naphthopyran derivative having molecules causing such a two-step/two-photon reaction has been found [Manabu Uchida and Masahiro Irie, "Photochromic Reaction of Naphthopyran Derivative", Dye and Chemical, Vol. 42, No. 6, p11–17 (1997); and M. Uchida and M. Irie, J. Am. Chem. Soc., 115, 6442 (1993)].

In this molecular system, a pyran structure on the left side of FIG. 4 is colored, and a bicyclo structure on the right side of FIG. 4 is colorless. When receiving one photon of an ultraviolet ray having a wavelength of 405 nm, the pyran structure is converted into a keto intermediate. The keto intermediate, which is in the ground state, is relatively unstable and is immediately returned to the original pyran structure by a thermal return reaction. When the intensity of irradiation light is weak, there occurs only a photochromic reaction between these two states, and when the light irradiation is interrupted, the structure of each molecule is returned to the original pyran structure. That is to say, when the intensity of irradiation light is weak, there occurs no invariant change. When the intensity of irradiation light is increased, the keto intermediate further absorbs one photon, and is converted into the colorless bicycle structure shown on the right side of FIG. 4. The bicyclo structure is stable. This means that there occurs a conversion having a threshold value with respect to the light intensity. The bicyclo structure is returned to the keto intermediate when irradiated with an ultraviolet ray having a wavelength of 334 nm, and then thermally returned to the pyran structure.

Figure 5:
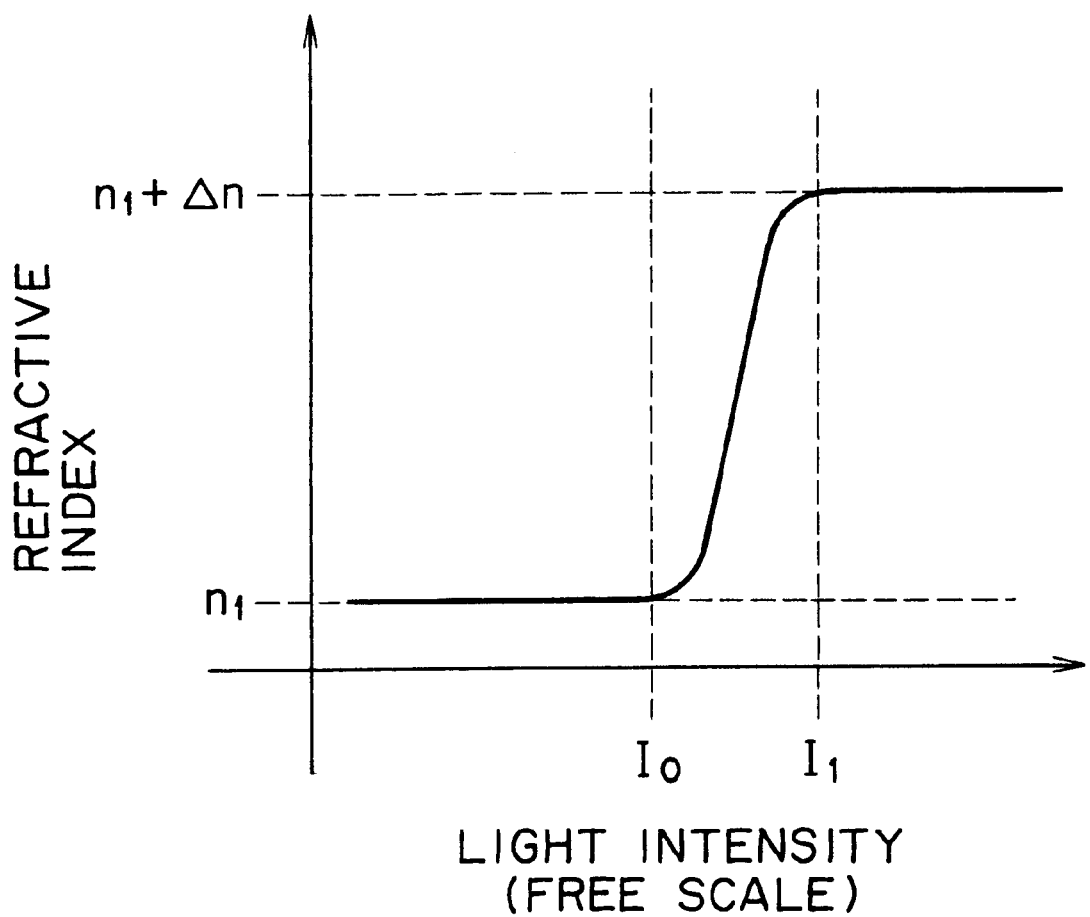
FIG. 5 is a graph showing a change in refractive index of the modulation element depending on a light intensity.

The naphthopyran derivative structure is converted from the pyran structure to the bicyclo structure by the above two-step/two-photon reaction. In this way, as shown in FIG. 5, the refractive index of the naphthopyran derivative is changed from $n_1$ to $(n_1+\Delta n)$ depending on the light intensity.

The element causing such a modulation phenomenon is disposed, as the optical switch 3, in the pixel portion of the display shown in FIG. 1. In this pixel portion, a laser light ray 4 (visual light ray) is usually waveguided, as a data signal light ray modulated with a data signal, in the optical waveguide (or optical fiber) 2 having a refractive index $n_1$, which waveguide is located on the lower side, while an ultraviolet ray 5 is waveguided, while being turned on/off, in the optical waveguide (or optical fiber) 1 having a refractive index $n_1$, which waveguide is located on the upper side. The ultraviolet ray 5 may be, as shown in (I) of FIG. 1, waveguided in pulses (interval: 16.7 msec; and frequency: 60 Hz). Alternatively, as shown in (II) of FIG. 1, an ultraviolet ray having a wavelength of 405 nm (corresponding to the two-photon reaction) and an ultraviolet ray having a wavelength of 334 nm (corresponding to the one-photon reaction) shown in FIG. 4 may be emitted while being alternately pulsed. In this case, the change of pyran structure→bicyclo structure (increase in refractive index) and the return reaction of bicyclo structure→keto intermediate→pyran structure are repeated.

Figure 2:
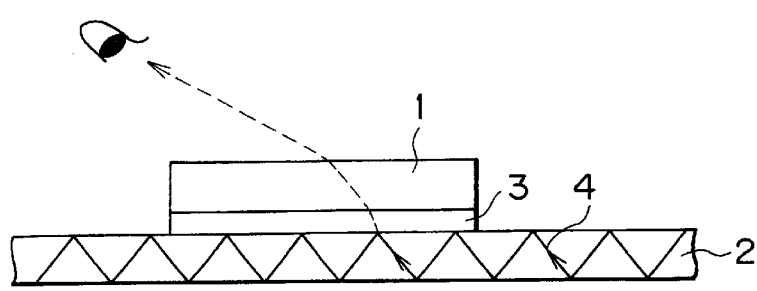
FIG. 2 is a schematic sectional view illustrating the principle of a phenomenon in which light is extracted from an optical waveguide (or optical fiber)

In this way, the refractive index of the modulation element 3 (optical switch) capable of absorbing light having a specific wavelength, located at the crossing portion, is modulated from $n_1$ to $(n_1+\Delta n)$ by irradiation of the ultraviolet ray in the optical waveguide (or optical fiber) 1, to module the total reflection angle of the visual light ray in the optical waveguide (or optical fiber) 2. Consequently, as shown by a broken line in FIG. 2, the visual light ray is extracted on the viewer side.

Since the visual light ray in the optical waveguide (or optical fiber) 2 can be extracted from the crossing portion (pixel portion) between both the optical waveguides (or optical fibers) 1 and 2 to the outside by linearly selecting the ultraviolet ray 5 in the optical waveguide (or optical fiber) 1 as a select signal, a signal light ray corresponding to a data signal can be made visible as a display image. This image display function of this display is characterized by selectively deriving a data signal light ray by selecting the optical waveguide (or optical fiber), and therefore, it serves as an operating function characterized by outputting a light signal. It should be noted that either the image display function or the computing function may be used. In this way, the display is useful not only as a collective light emission display device but also as a collective light emission operating device or two-dimensional optical operating device.

Figure 3A:
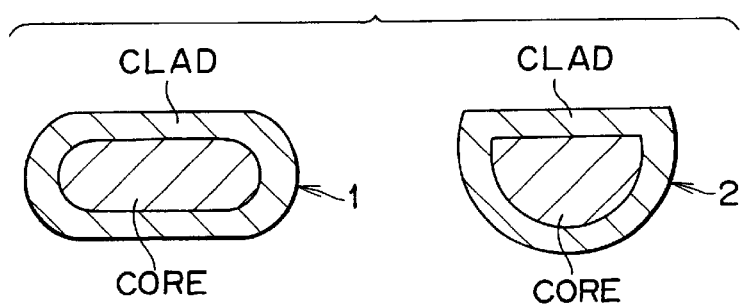
FIG. 3A is a schematic sectional view showing two kinds of optical fibers.
Figure 3B:
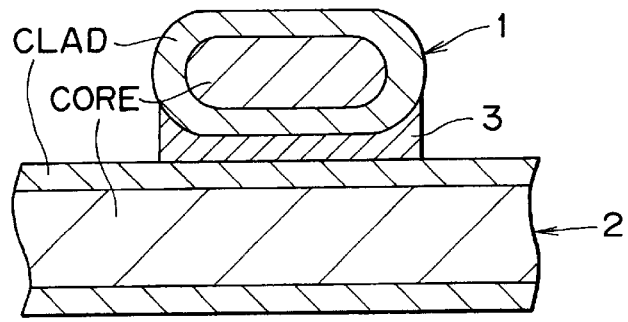
FIGS. 3b and 3C are schematic sectional views showing display pixel portions using the optical fibers shown in FIG. 3A.
Figure 3C:
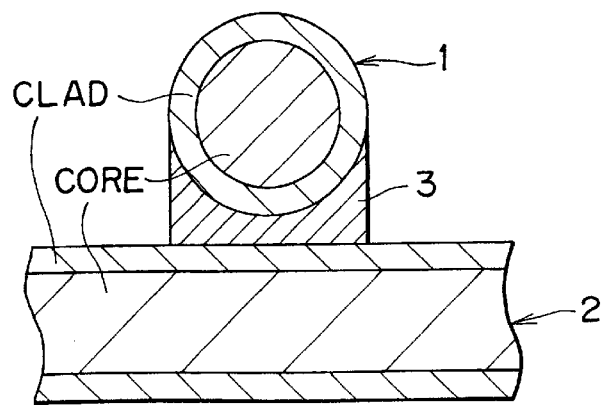

The above pixel portion shown in FIG. 1 may be replaced with a pixel portion shown in FIG. 3B or 3C using two kinds of optical fibers 1 and 2 shown in FIG. 3A. In this case, the same optical switch function as that described above can be obtained.

In the above first embodiment, the modulation element whose refractive index is increased by light irradiation is used; however, it may be replaced with a modulation element whose refractive index is decreased by light irradiation.

Such a modulation element whose refractive index is decreased by light irradiation will be described with reference to FIGS. 6A and 6B. FIGS. 6A and 6B show a pixel portion of a cruciform three-dimensional optical waveguide (or optical fiber) display according to a second embodiment of the present invention. As shown in this figures, laser light rays 14 and 15 having the same wavelength are waveguided in both optical waveguides (or optical fibers) 11 and 12 optically coupled to a crossing portion (or modulation portion) 13. When the total of the light intensities of the laser light rays 14 and 15 exceeds a threshold value of the modulation portion 13, the modulation portion 13 is modulated such that the refractive index thereof is decreased and thereby the state thereof is changed from a state shown in FIG. 6B to a state shown in FIG. 6A, with a result that the visual light ray can be extracted on the viewer side.

Figures 7A, 7B:
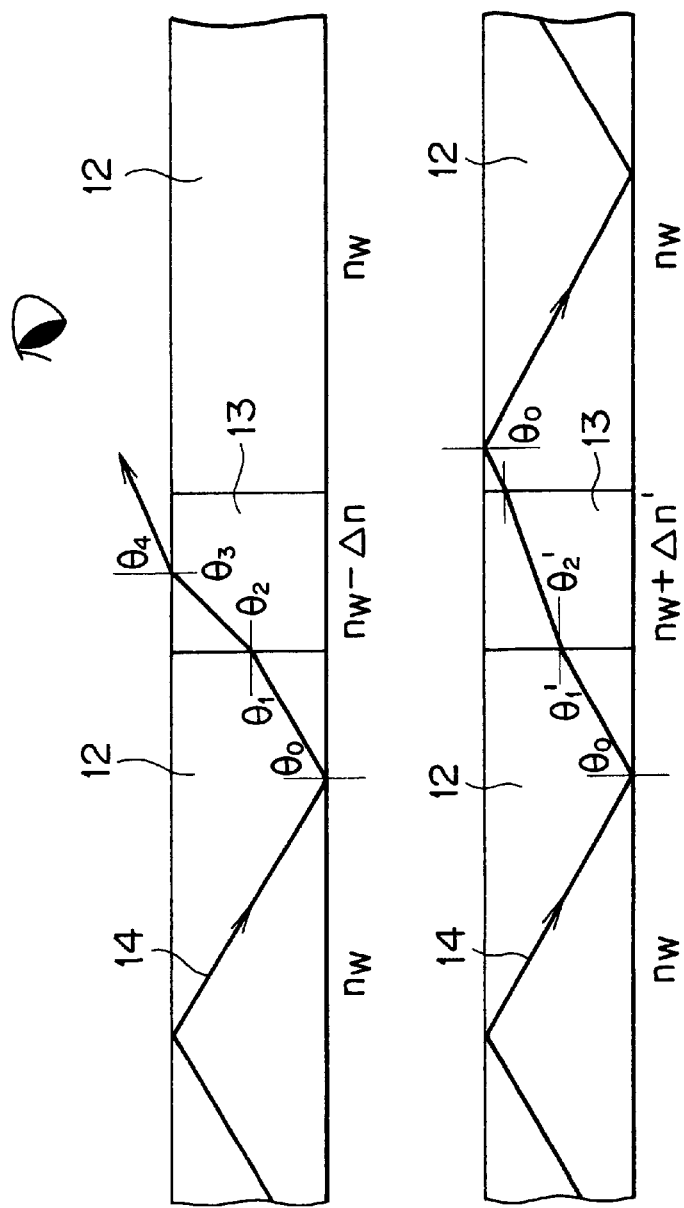
FIGS. 7A and 7B are schematic sectional views illustrating the principle of a phenomenon in which light is extracted from an optical waveguide (or optical fiber)

FIGS. 7A and 7B show the principle of modulation in refractive index of the crossing portion of the display pixel portion according to the second embodiment. In these figures, the refractive indexes of the crossing portion in two states are designated by characters $(n_w-\Delta n)$ and $(n_w+\Delta n')$. Assuming that $n_w=1.490$, $(n_w-\Delta n)=1.485$, and $(n_{w+\Delta n'})=1.495$ for causing the modulation in refractive index, the refractive angles $\theta_0$ to $\theta'_2$ become the following values: $\theta_0=42.155°$, $\theta_1=47.845°$, $\theta_2=48.058°$, $\theta_3=41.942°$, $\theta_4=82.995°$, $\theta'_1=47.845°$, and $\theta'_2=47.634°$. As shown in FIG. 7B, when only one laser light ray (waveguide light ray) 14 passes through the crossing portion 13 and the other laser light ray 15 does not enter the crossing portion 13, the refractive index $(n_w+\Delta n')$ of the crossing portion 13 is not changed, so that the waveguide light ray 14 continuously passes through the crossing portion 13. On the other hand, as shown in FIG. 7A, when the laser light ray 15 enters the crossing portion 13, the light intensity of the laser light ray 15 is added to the light intensity of the laser light ray 14 and thereby the refractive index of the crossing portion 13 is reduced to the value $(n_w-\Delta n)$, so that the laser light ray 14 is extracted from the crossing portion 13 to the outside. In addition, the laser light ray 15 may be taken as a select signal light ray, and the laser light ray 14 be taken as a data signal light ray.

If the crossing portion 13 of the cruciform optical waveguide display shown in FIGS. 6A and 6B is made from a material whose refractive index is increased by optical excitation, the modulation in refractive index of the crossing portion 13 is reversed to that described with reference to FIGS. 7A and 7B. That is to say, when not optically excited, the crossing portion 13 allows the extraction of the waveguide light ray 14 therefrom, and when optically excited, the crossing portion 13 whose refractive index is increased by the optical excitation prohibits the extraction of the waveguide light ray 14 therefrom.

Figure 8:
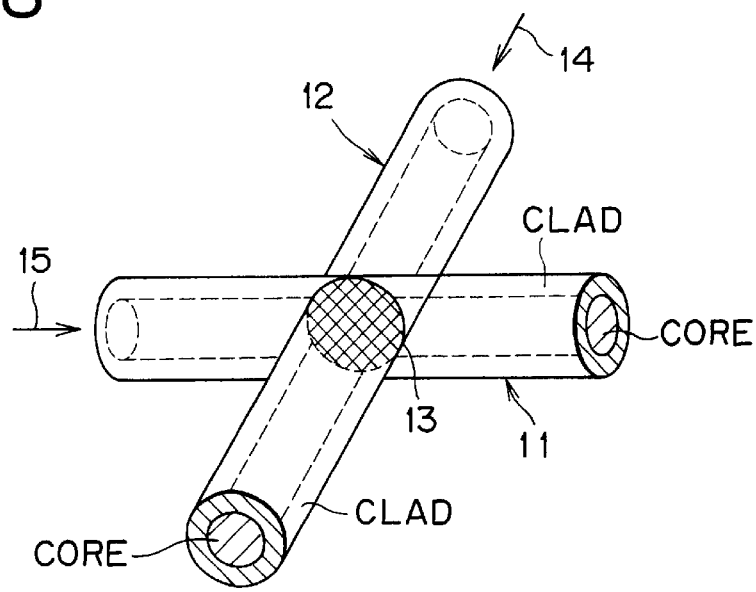
FIG. 8 is an enlarged perspective view of a display pixel portion using an optical fiber.

The above-described switch element of the cruciform optical waveguide display may be replaced with a cruciform switch element formed by optical fibers 11 and 12 shown in FIG. 8.

Figure 9:
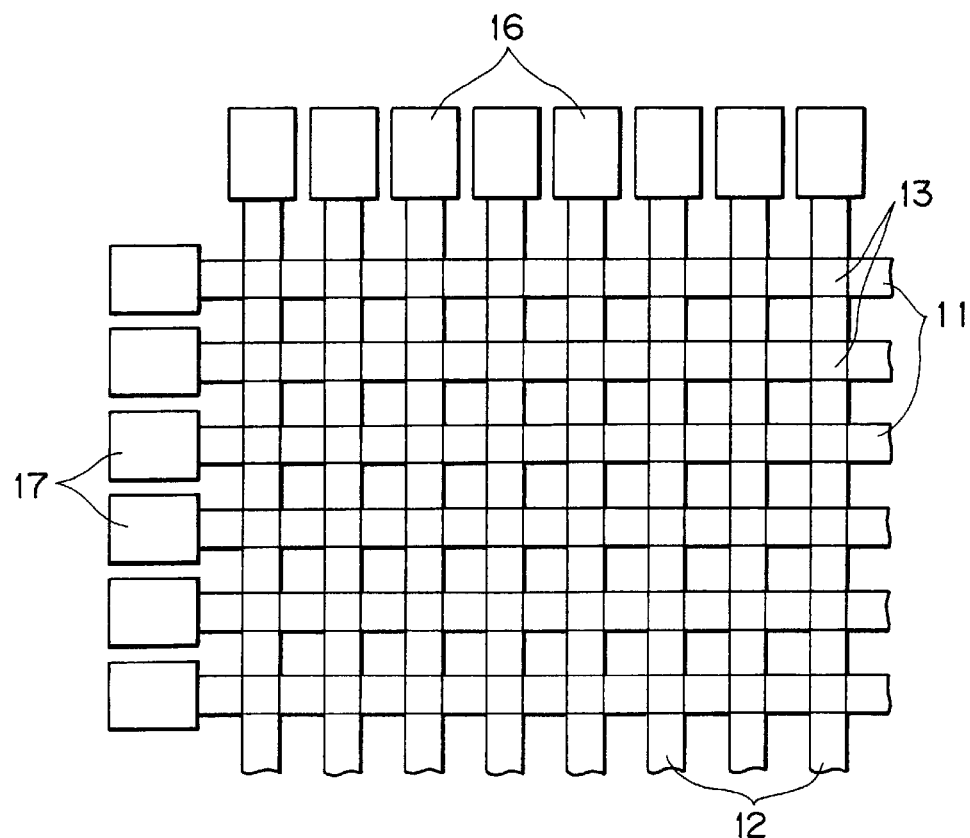
FIG. 9 is a schematic diagram showing the layout of a display using the display pixel portion according to the second embodiment of the present invention.

A display of the present invention including the pixel portions according to the second embodiment will be described with reference to FIG. 9.

In this display of the present invention, the cruciform optical waveguides (or optical fibers) shown in FIGS. 6A and 6B and FIGS. 7A and 7B, or FIG. 8 are arranged within the same plane in such a manner as to cross each other at crossing points (pixels). Concretely, 1,600 pieces of optical waveguides (or optical fibers) 12 are arranged in the vertical direction, and 1,200 pieces of optical waveguides (or optical fibers) 11 are arranged in the horizontal direction, to form 1,920,000 pieces of crossing points (pixels). That is to say, this display has 1,920,000 pieces of pixels. In this display, as shown in FIG. 9, a data signal light ray having the light intensity matched to display each pixel is supplied, as a signal for controlling the light intensity, in the vertical direction from each light source 16 to the corresponding optical waveguide (or optical fiber) 12, and a select signal light ray is supplied, as a signal for selecting the whole of each optical waveguide (or optical fiber) only, in the horizontal direction from each light source 17 to the corresponding optical waveguide (or optical fiber) 11. The select signal light ray is turned on/off with the light intensity equal to the threshold value or zero intensity. In the display shown in FIG. 9, the light sources 16 (or 17) are directly optically coupled to the optical waveguides (or optical fibers) on the one-to-one correspondence. The light sources may be connected (indirectly optically coupled) to the optical waveguides (or optical fibers) via optical waveguide members such as optical fibers. A common light source may be connected to the optical waveguides (or optical fibers) via optical waveguide members. Alternatively, the light sources may be connected to the optical waveguides (or optical fibers) by making use of the direct optical coupling in combination with the indirect optical coupling.

By arranging 4,800 pieces of the vertical optical waveguides (or optical fibers) 12 corresponding to red, green, and blue of visual light while repeating them in this order, a full-color display having 1,920,000 pieces of pixels can be obtained. With respect to the horizontal optical waveguide (or optical fiber) 11, as described above, the whole thereof is selected by a selected signal light ray, and accordingly, if the display shown in FIG. 9 adopts the existing UXGA progressive display mode, the horizontal optical waveguide (or optical fiber) 11 is driven for about 14 $\mu$sec (1/60/1200 second) as an optical switch. In this case, since the optical switch of this display makes use of the photonics and is switchable in the order of nano-second, it can be sufficiently switched. That is to say, it is apparent that the above-described drive mode is suitable for the photonics switching. Even if the optical switch is made from a material different from the above material, which is capable of modulating the distribution of electronic density and has no memory characteristic (for example, polydiacetylene), it may extract light for about 14 $\mu$sec. Such a display time is sufficient to the eyes of a viewer in consideration of the existing CRT display in which light emission occurs only in the order of nano-second. Also, there does not occur a problem associated with the dimming of a moving picture in a liquid crystal display caused by continuous lighting for one frame time (1/60 second).

The display of the present invention can control, as described above, the light not by use of any electric field and current but by use of only the light intensity, and therefore, such a display is usable as a new display device (or collective light emission operating device) having a high quality, for example, a high contrast. In addition, the display shown in FIG. 9, which includes the pixel portions according to the second embodiment, may include the pixel portions according to the first embodiment shown in FIG. 1.

Here, as the modulation element usable at the crossing portion (pixel), there can be adopted one kind or a combination of two kinds or more selected from a group consisting of an element capable of modulating its refractive index by optical excitation, an element of modulating its distribution of refractive index by optical excitation, an element capable of modulating its intensity of light emission by optical excitation, an element capable of modulating its coloring density by optical excitation, an element capable of modulating its dielectric constant by optical excitation, an element capable of modulating its magnetic permeability by optical excitation, a liquid crystal element capable of modulating its orientation state of liquid crystal by optical excitation, and an element allowing light scattering by optical excitation. Some of the modulating modes of the above-described modulation elements will be described in detail below.

(1) Modulation In Refractive Index

The refractive index (n) of an organic compound is expressed by the following chemical formula:
[Formula 1]

$$n = \sqrt{\frac{M+dR}{M-dR}} = \sqrt{\frac{M+d\cdot\frac{4\pi}{3}\cdot N\cdot\alpha}{M-d\cdot\frac{4\pi}{3}\cdot N\cdot\alpha}} \quad (*)$$

where M: molecular weight, d: density, R: molecular refraction, N: Avogadro number, and α: polarizability.

(*): Chemical Dictionary Vol. 8, published by Kyouritsu Shuppan Kabushiki Kaisha in 1962, p186

Figure 11:
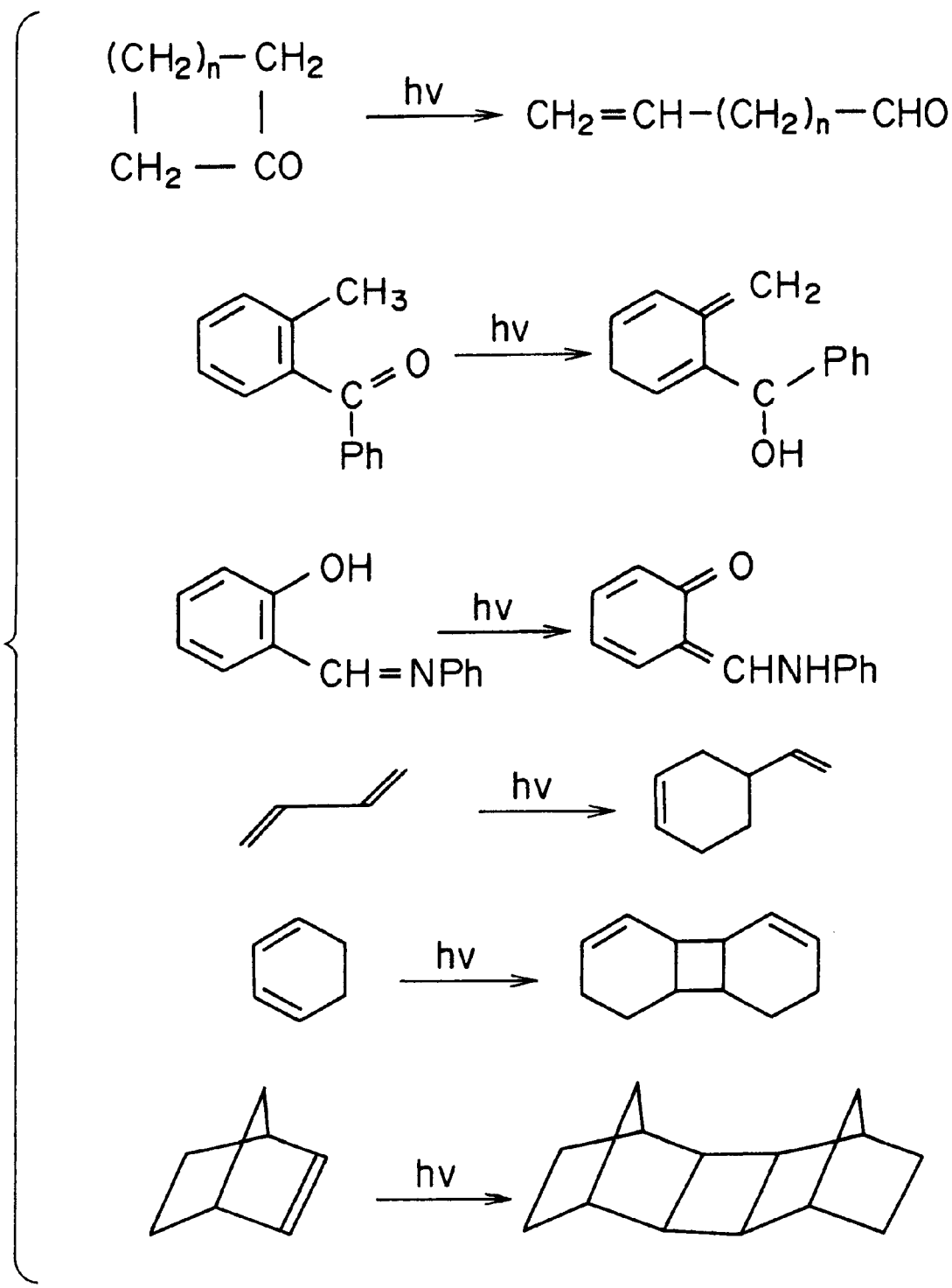
FIG. 11 is a diagram of chemical formulas each showing a change in structure, due to light, of an organic compound for a modulation element usable for the present invention.

As is apparent from the above chemical formula, the refractive index can be made large by increasing the polarizability, and can be made small by decreasing the polarizability. The polarizablity of an organic compound can be increased by bonding new atoms or atomic groups to molecules of the organic compound, as exemplified by the above-described naphthopyran derivative. On the other hand, the polarizability can be decreased, typically, by cutting the bonding of a conjugated portion. In particular, various derivatives whose refractive indexes are changed by a light energy are generated in the manners shown in FIG. 11, for example, cleavage of cycloketone, addition reaction of olefin, and enolization of aromatic group substitution ketone.

For an inorganic compound, the refractive index is decreased (that is, a variation Δn of the refractive index becomes negative) by free electrons excited by light in accordance with the following equation described in the document ("Heterostructure Lasers", H. C. Casey, Jr. and M. B. Panish, Academic Press, New York, 1978). [Formula 2]

$$\Delta n = -(n\times q^2/2M_n\omega^2\epsilon)\bar{n}$$

where $\bar{n}$: density of free electrons, q: electric charges, and $m_n$: effective mass of electron.

The above-described equation can be given even if electrons are replaced with holes. For a p-type material, the density of holes is designated by "p", and the effective mass of holes is designated by "$m_p$".

For GaAs transparent to infrared rays, since $q^2/\epsilon=2.21\times 10^{-19}$ erg·cm, $\epsilon=13.1$ $\epsilon_0$, $m_n=0.067$ $m_0$, $m_0=9\times 10^{-28}$ g, $\lambda_0=0.9$ μm, and $\omega^2=4.4\times 10^{30}$ rad/s, the density of free electrons $\bar{n}$ becomes about 3.6, and $\Delta n=-1.5\times 10^{-21}\bar{n}$ is given from the above equation. Accordingly, when the density of carriers ($n\sim 1\times 10^{18}$ cm$^{-3}$) are excited by light, Δn becomes $-1.5\times 10^{-3}$.

To satisfy the relationship of Δn>0, as is known, the refractive index can be increased by about 5 to 10% by making light equivalent to a band gap Eg incident on the inorganic compound.

(2) Various Pixel Forming Materials

Structural formulas of some of various pixel forming materials (used for the crossing portion of optical waveguides or optical fibers) including the above described materials usable for the present invention are shown in FIG. 12.

The properties of the naphthopyran derivative are as described above. A polydiacetylene based organic high polymer known as a three-dimensional non-linear material capable of changing its refractive index depending on the light intensity exhibits functions such as a conductivity and a non-linear optical characteristic based on a π electron conjugated system in the principal chain direction, and therefore, it exhibits a large function in the principal direction but exhibits any function little in the direction perpendicular to the principal chain direction, that is, it has a large anisotropy in the principal direction.

Further, spirobenzopyran (colorless⇌blue), azobenzen (light yellow⇌orange), flugide (light yellow⇌orange), diarylethene (colorless⇌red) can be usable, and benzophenone based polyimide as a material for forming an liquid crystal orientation film is changed in its structure by light irradiation, to change the liquid crystal orientation state.

The present invention will be more fully understood by way of the following examples:

EXAMPLE 1

Figure 13A:
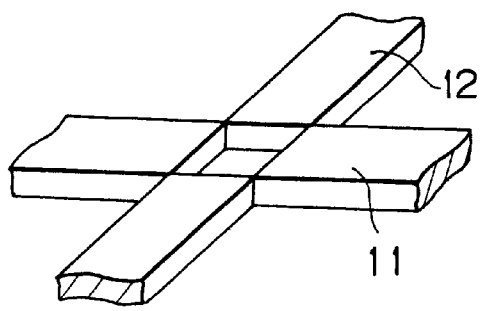
FIGS. 13A to 13C are perspective views each showing a method of preparing an optical waveguide (or optical fiber) and a drive manner thereof in Example 1.
Figure 13B:
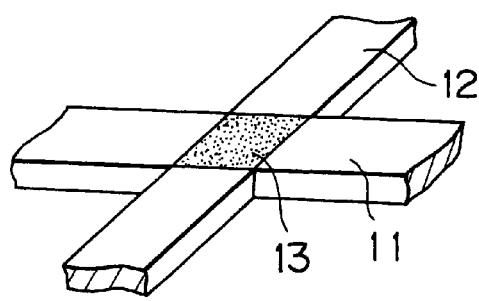

As shown in FIG. 13A, cruciform optical waveguides (or optical fibers) 11 and 12, except for a crossing portion thereof, made from polysiloxane (refractive index: 1.49, produced by Toray Industries, Inc.) were formed on a glass substrate by a printing method. Then, as shown in FIG. 13B, a pigment containing solution obtained by dispersing 10% of a diazo based pigment (azobenzene shown in FIG. 12) in a water solution containing 20% of polyvinylalcohol (refractive index: 1.51) was dropped in a central recessed portion (corresponding to the crossing portion) of the cruciform optical waveguides 11 and 12, and was dried at 90° C. for several hours, to form a diazo based pigment containing layer 13. The above layer formation was repeated until the thickness of the layer 13 became nearly equal to that of the polysiloxane layers. 11 and 12.

Figure 13C:
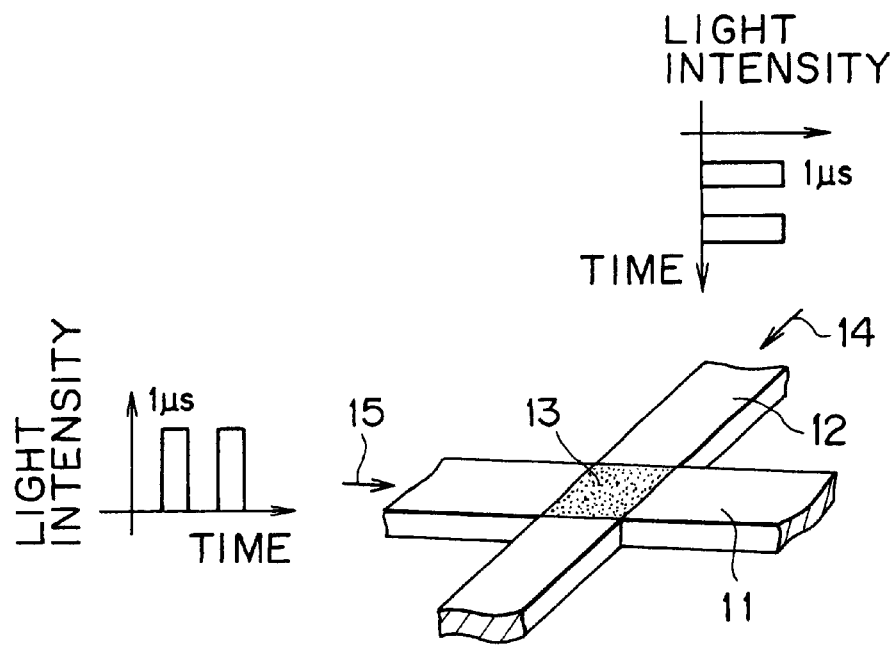

The sample thus produced was tested as follows: namely, as shown in FIG. 13C, semiconductor laser light rays 14 and 15 (wavelength: 510 nm) were waveguided to the optical waveguides (or optical fibers) 11 and 12 of the sample by using prisms, to be thus optically coupled to each other at the crossing portion 13. The laser light ray was emitted in pulses of 1 μsec. As a result, it was observed that a green light ray was turned on/off at the central optical switch portion 13.

EXAMPLE 2

Figure 14:
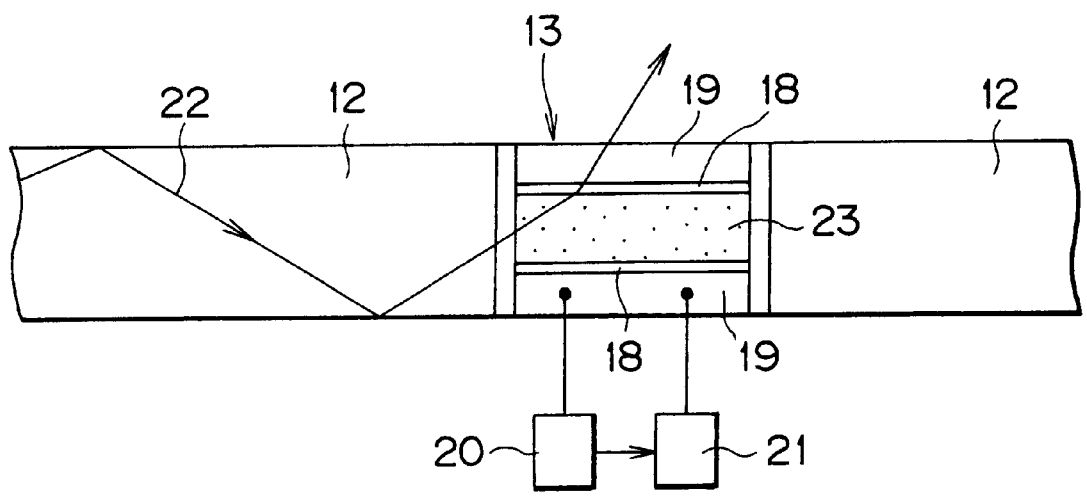
FIG. 14 is a schematic sectional view illustrating the principle of a phenomenon in which light is extracted from an optical waveguide (or optical fiber) prepared in Example 2.

As shown in FIG. 14, benzophenone based polyimide capable of changing the structure or orientation state of liquid crystal by optical irradiation (see FIG. 12) was formed on a glass substrate 19 by spin-coating, to form an orientation film 18 on the glass substrate 19. Two pieces of the substrates 19 thus prepared were not subjected to rubbing and stuck to each other, to produce a cell 13 with a gap of 1.7 μm put between the substrates 19. The cell 13 was disposed at the crossing portion of the optical waveguides 11 and 12 used in Example 1 (see FIGS. 13A to 13C). A ferroelectric liquid crystal material (trade name: CS-1025, produced by Chisso Corporation) 23 in the isotropic phase was injected in the cell, and gradually cooled to room temperature. A liquid crystal temperature detecting element 20 such as a thermocouple was connected to the cell. It should be noted that the detecting element 20 is not necessarily provided. A heater element 21 for controlling the liquid crystal temperature on the basis of the detected temperature was connected to the cell.

Four pieces of the above cells were prepared, and the temperatures of the cells were set at 10° C., 20° C., 30° C., and 40° C. Then, light rays 22 (wavelength: 366 nm) emitted from high-pressure mercury lamps were waveguided in the optical waveguides (or optical fibers) and optically coupled to each other at the crossing portion in the same manner as that described in Example 1 (see FIG. 13C). As a result, it was observed that as shown in FIG. 14, the structure (or the orientation state of liquid crystal) of the orientation film 18 was changed by light irradiation and thereby the light ray 22 was selectively extracted to the outside, and further as the cell temperature became higher, the extraction of the light ray became larger and thereby the reversal of polarization of liquid crystal uniformly occurred.

EXAMPLE 3

Figure 15:
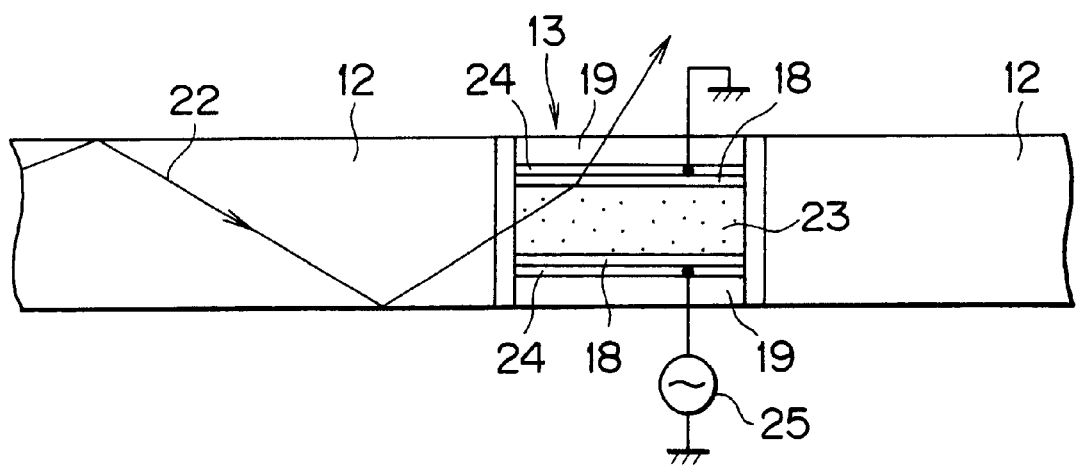
FIG. 15 is a schematic sectional view illustrating the principle of a phenomenon in which light is extracted from an optical waveguide (or optical fiber) prepared in Example 3.

As shown in FIG. 15, like Example 2, an orientation film 18 made from benzophenone based polyimide was formed on a glass substrate 19 provided with a transparent electrode 24 made from ITO (Indium Tin Oxide) by spin-coating. Two pieces of the substrates 19 thus prepared were not subjected to rubbing and stuck to each other, to produce a cell with a gap of 1.7 μm put between the substrates 19. Two pieces of the cells were produced in accordance with the above procedure. The ferroelectric liquid crystal material (trade name: CS-1025, produced by Chisso Corporation) in the isotropic phase was injected in each cell, and gradually cooled to room temperature.

A high frequency power supply 25 was connected to one cell, and a voltage of ±0.5 V in the rectangular wave of a frequency of 10 kHz was applied, as the rectangular wave of a frequency of 10 kHz, to the cell; and no voltage was applied to the other cell. Light rays 22 (wavelength: 366 nm) emitted from high-pressure mercury lamps were waveguided in optical waveguides (or optical fibers) and optically coupled to each other at each cell. As a result, it was observed that upon extraction of the light ray from the cell by changing the orientation state of liquid crystal of the orientation 18 by optical excitation, the degree of extraction of the light ray from the cell to which the high frequency electric field was applied was larger than the degree of extraction of the light ray from the cell to which no electric field was applied, and thereby the reversal of polarization of the ferroelectric liquid crystal uniformly (not depending on the uneven cell gap) occurred at the cell to which the high frequency electric field was applied.

The above description of the embodiments and examples is for illustrative purpose only, and it is to be understood that changes and variations may be made without departing from the technical thought of the present invention.

For example, the optical switch function can be realized by using a modulation element made from an inorganic material or a hybrid material including an inorganic material and an organic material. Further, the optical switching may be made by making use of not only the intensity of incident light but also the polarization and phase of incident light.

What is claimed is:
1. An optical device comprising:
   a plurality of first optical waveguides arranged in the horizontal direction;
   a plurality of second optical waveguides arranged in the direction perpendicular or nearly perpendicular to said first optical waveguides, said second optical waveguides being not optically coupled to said first optical waveguides at crossing portions at which said first and second optical waveguides cross each other; and
   elements to be excited by light rays waveguided in said first and second optical waveguides, said elements being arranged at said crossing portions;
   wherein said elements to be excited are selected for each line of a plurality of lines comprising said first optical waveguides by intensities of light rays in said first optical waveguides functioning as horizontal waveguides, and by light rays, which are in said second optical waveguides functioning as vertical waveguides, that are modulated in intensity on a basis of data signals, and the light rays whose intensities have been modulated on the basis of the data signals are extracted to an outside via said selected elements to be excited.
2. An optical device comprising:
   a plurality of first optical waveguides arranged in the horizontal direction;
   a plurality of second optical waveguides arranged on a same plane as the plane on which said first optical waveguides are arranged, said second optical waveguides being perpendicular or nearly perpendicular to said first optical waveguides; and
   elements to be excited by light rays waveguided in said first and second optical waveguides, said elements being arranged at crossing portions at which said first and second optical waveguides cross each other;
   wherein said elements to be excited are selected for each line of a plurality of lines comprising said first optical waveguides by intensities of light rays in said first optical waveguides functioning as horizontal waveguides, and by light rays, which are in said second waveguides functioning as vertical waveguides, that are modulated in intensity on a basis of data signals, and the light rays whose intensities have been modulated on the basis of the data signals are extracted to an outside via said selected elements to be excited.

* * * * *